United States Patent
Bernabeu-Auban et al.

(10) Patent No.: US 7,496,576 B2
(45) Date of Patent: Feb. 24, 2009

(54) ISOLATED ACCESS TO NAMED RESOURCES

(75) Inventors: Jose M. Bernabeu-Auban, Sammamish, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 11/394,667

(22) Filed: Mar. 30, 2006

(65) Prior Publication Data

US 2007/0233686 A1    Oct. 4, 2007

(51) Int. Cl.
*G06F 17/30* (2006.01)
(52) U.S. Cl. .............................. 707/9; 726/1
(58) Field of Classification Search ............ 707/9; 726/1
See application file for complete search history.

(56) References Cited

U.S. PATENT DOCUMENTS

| 5,173,939 A | 12/1992 | Abadi et al. | 707/9 |
| 5,961,582 A * | 10/1999 | Gaines | 718/1 |
| 2004/0064721 A1 | 4/2004 | Murching et al. | 726/1 |
| 2004/0225896 A1 | 11/2004 | Ng | 726/6 |

FOREIGN PATENT DOCUMENTS

JP     10111833    4/1998

OTHER PUBLICATIONS

Wright, C., "Kernek Korner-Unionfs: Bringing Filesystems Together", *Linux Journal*, Nov. 19, 2004, http://www.linuxjournal.com/article/7714, 18 pages.

* cited by examiner

*Primary Examiner*—Christian P. Chace
*Assistant Examiner*—Kellye Buckingham
(74) *Attorney, Agent, or Firm*—Woodcock Washburn LLP

(57) ABSTRACT

When a process running in an isolated execution environment is started by a user, the credentials of the user are associated with a naming environment for the isolated execution environment. The isolated execution environment may be implemented via creation of a namespace representing resources available to one or more processes running within the isolated execution environment. The resources available to the isolated processes may represent some subset of global resources. When a request to access a named resource is received, the request is mediated by the operating system. Access, if provided, may be provided via the naming environment associated with the isolated execution environment. The operating system determines whether to grant or deny access to the resource by checking the credentials associated with the naming environment with the ACL of the resource.

19 Claims, 3 Drawing Sheets

ISOLATED ACCESS TO NAMED RESOURCES

BACKGROUND

In most current commercial operating systems an application shares resource namespaces with other applications running on the machine. The application's access to resources is mediated by a security mechanism that attaches an Access Control List (ACL) to each named resource. The ACL relates a user to a set of access rights for that particular resource. For example, the ACL for a particular resource may specify that user 1 is allowed read-write access to the resource and that user 2 is allowed read-only access to the resource.

In many known systems, when a process is created, the credentials of the user creating the process are associated with the process by the operating system. That is, typically an application, when running, is associated with the credentials of the user that started the application. Thus, if user 1 has access to files A through F and user 1 starts application X, application X will have access to files A through F, even if it only needs file B. A running application passes a resource to another running application by passing the name of the resource to the receiving application. As both the sending and the receiving application usually share a global namespace, this mechanism works, as long as the same user started both applications. If user 1 starts application X and application Y, and application X passes the name of file A to application Y, application Y will have access to file A because user 1 has access to file A. A problem may arise, however, when the receiving application has different credentials than the sending application. If one user starts the sending Application, and a second user starts the receiving application, the possibility exists that the receiving application will be unable to use the resource, because the ACL of the resource may not grant the second user the right to access the resource or may not grant the second user the same set of rights that the first user has.

One common mechanism employed to overcome this consequence of the ACL-based security system, is impersonation, which enables an application that receives a message to temporarily adopt the identity of the user who started the sending application. This enables access to be granted according to the access rights of the user who started the sending application. This approach may be problematic when the receiving application is not a trusted application because impersonation may provide the receiving application with access rights to resources the receiving application should not have.

SUMMARY

When a process is created (by a user), the operating system attaches the credentials of the user to a resource access environment that the process will use to request access to any resource in the system. The process is isolated so that it can only request resources via this resource access environment. The resource access environment may be implemented via creation of a namespace representing resources available to one or more processes running within the isolated execution environment. Requests to access a named resource are associated (either implicitly or explicitly) with a resource access environment. When a request to access a named resource is received, the request is mediated by the operating system. Access, if provided, may be provided via the naming environment associated with the request. The operating system determines whether to grant or deny access to the resource by checking the credentials associated with the resource access environment with the ACL of the resource.

When a first process (a sending process) wants to give access to a resource to a second (receiving) process, the sending process requests the operating system to create a reference to that resource, which may potentially entail creation of a second naming environment (e.g., a second namespace) from the first naming environment (associated with the sending process), in case the resource itself is a namespace (e.g., a file system directory), or the reference is a name which will be resolved within that named environment. The second namespace is a subset of the namespaces available to the sending process, sharing its user credentials, and may provide a different level of access rights than that associated with the first namespace or may provide a namespace in which certain resources are invisible to the receiving process. An open handle to a resource, a resource name and namespace or an open handle to a namespace may be sent to the receiving process. If the resource name and namespace is sent to the receiving process, the resource name is resolved within the context of the received namespace.

The first process may send a resource or reference to one or more receiving processes. Similarly the receiving process may itself be a sending process as described, to any degree of nesting. When the sending process wishes to revoke a namespace it created, (the sending process revokes the second namespace), the operating system reclaims the second namespace and subsequent attempts to access a handle to a resource in the namespace or a handle to the namespace will return an error. Likewise, any resource request received for a resource represented in the second namespace will fail.

DETAILED DESCRIPTION

Overview

An operating system according to some embodiments of the present invention mediates communications between processes running in isolated execution environments. The operating system attaches the credentials of the user to a resource access environment that the process will use to request access to any resource in the system. A resource access environment may be implemented via a namespace or naming environment for the process in which a global resource namespace is replaced with a local resource namespace in which typically only a subset of the global resource namespace is available to the isolated process.

When a process is initiated, instead of associating the credentials of the user who started the process with the process, the credentials of the user who started the process are associated with the namespace of the isolated execution environment. When a process in the isolated execution environment wants to pass a resource to another process, which may or may not have been initiated by the same user, a second namespace based on the namespace of the first isolated execution environment is created. The second namespace, though based on the first namespace, may restrict the resources available to a second process associated with the second namespace to a subset of the resources available via the first namespace.

Exemplary Computing Environment

Figure 1:
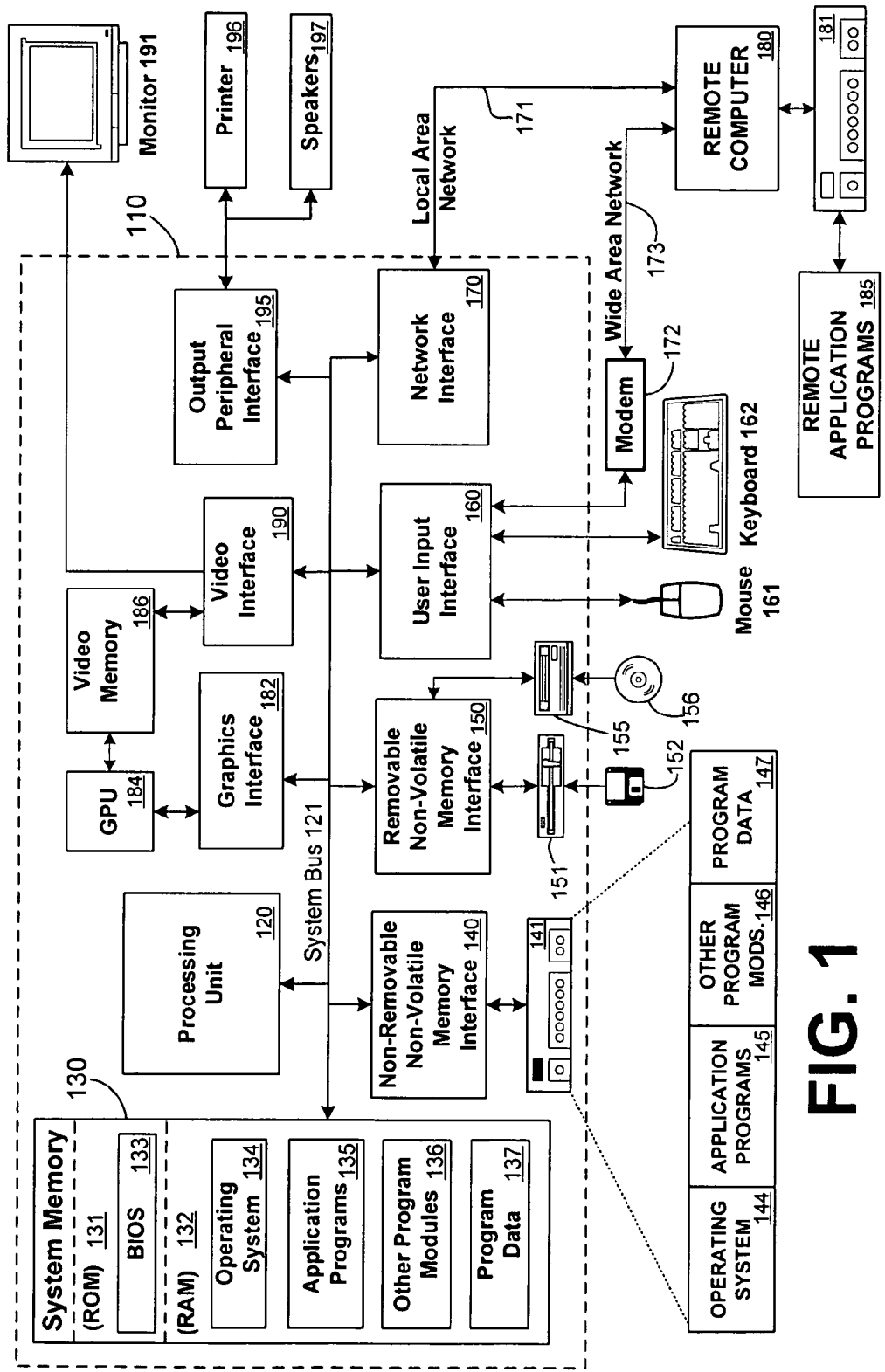
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typical embodies computer readable instructions, data structures, program modules or other data. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Isolated Access to Named Resources

The operating system controls access to named resources by associating the credentials of a user to a resource access environment, and associating the environment to the process. When the operating system receives a request to open a named resource, the operating system checks the credentials associated with the isolation environment (e.g., implemented via creation of a namespace) against the ACL of the requested named resource. If the credentials associated with the namespace are sufficient, access to the resource is granted.

Figure 2:
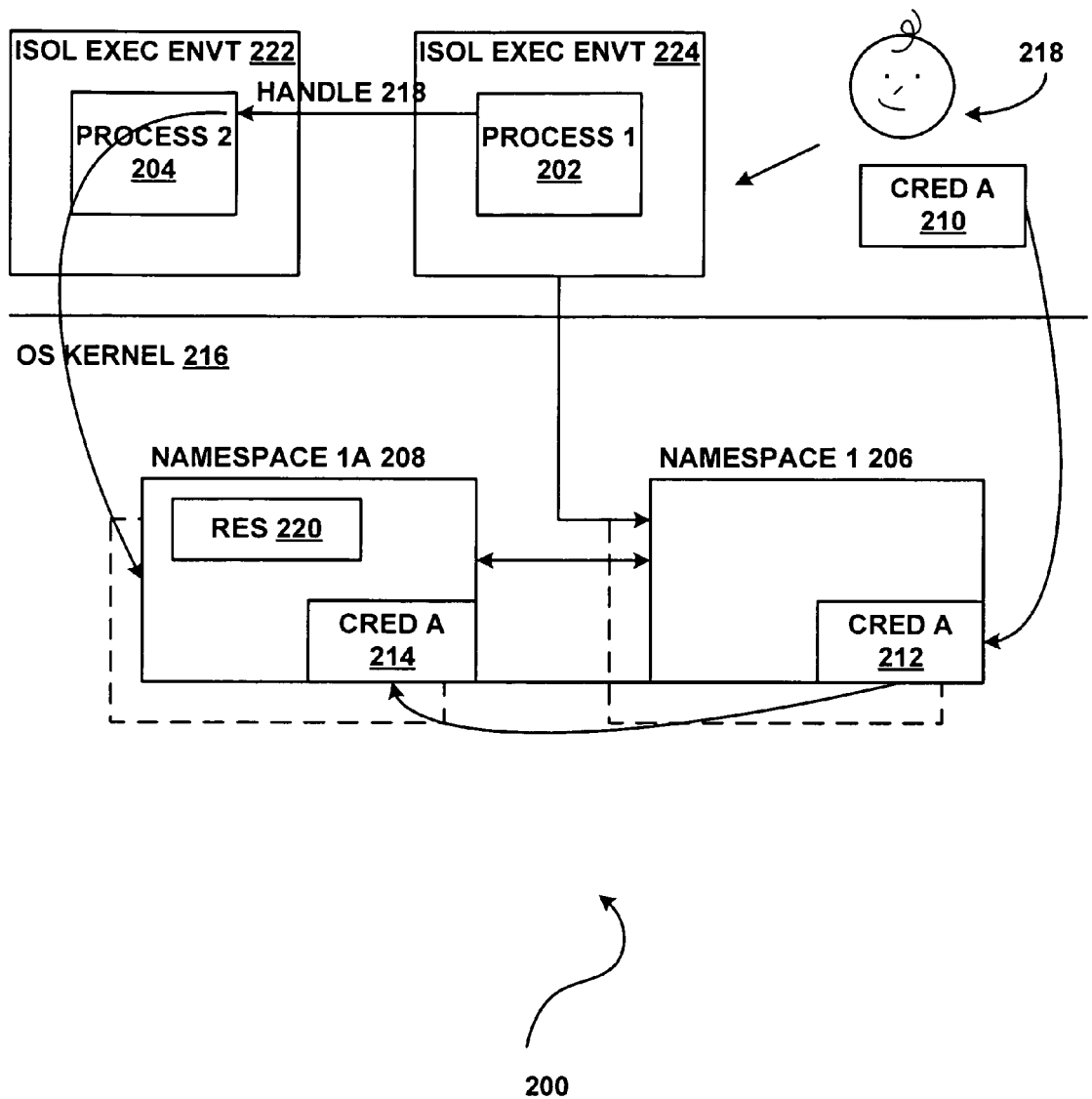
FIG. 2 is a block diagram of a system for isolated access to named resources in accordance with some embodiments of the invention.

FIG. 2 illustrates one embodiment of a system 200 for isolating access to named resources. System 200 may reside on a computer such as computer 110 described above with respect to FIG. 1. In FIG. 2, a process such as process 1 202 running in isolated execution environment 224 may be initiated by a user 218 having credentials such as credentials A 210. When process 1 202 is initiated, user 218's credentials (e.g., credentials A 210) are associated with the isolation environment in which process 1 202 is executed. One element of the isolation environment receiving those credentials is a naming environment such as namespace 1 206. If process 1 202 subsequently wants to pass a reference to a resource to process 2 204 running in isolated execution environment 222, which may not have been initiated by user 1 218, a new naming environment such as namespace 1A 208 may be created and the credentials associated with namespace 1 206 (e.g., credentials A 210) may be associated with the new namespace (e.g., namespace 1A 208). The new naming environment (e.g., namespace 1A 208) may be created from the existing naming environment (e.g., from namespace 1 206) and may represent a subset of namespace 1 206, or may represent a view of namespace 1 206, such that some resources represented in the original namespace are not visible to process 1 204, or may represent a view of namespace 1 206, such that some resources are available via different names. In some embodiments of the invention, a process such as process 1 202 may restrict the level of access in the new naming environment with respect to the level of access available in the original environment. In some embodiments of the invention, a process can invalidate a naming environment which it has created. (For example, process 1 202 may invalidate the namespace 1A 208 that it created.) Process 1 202 may then pass a reference to the resource (e.g., resource 220) to process 2 204. The reference passed from the sending process, process 1 202 to the receiving process, process 2 204 may be an open handle to the resource, a name and an open handle to a naming environment, with the intention that the name will be resolved within the naming environment or an opened naming environment. In some embodiments of the invention, the naming environment mechanism is implemented within the kernel of the operating system. It will be appreciated that a sending or receiving process may be associated with one or more resource access environments.

The above mechanism provides a way to eliminate the need to trust a receiving process and to use impersonation, because the set of resources available to the receiving process can be limited to that subset of the original namespace which are "safe" for the receiving process to manipulate. The above mechanism also provides a way to control the passing of named resources and may make it possible to safely pass sets of resources between running processes.

Figure 3:
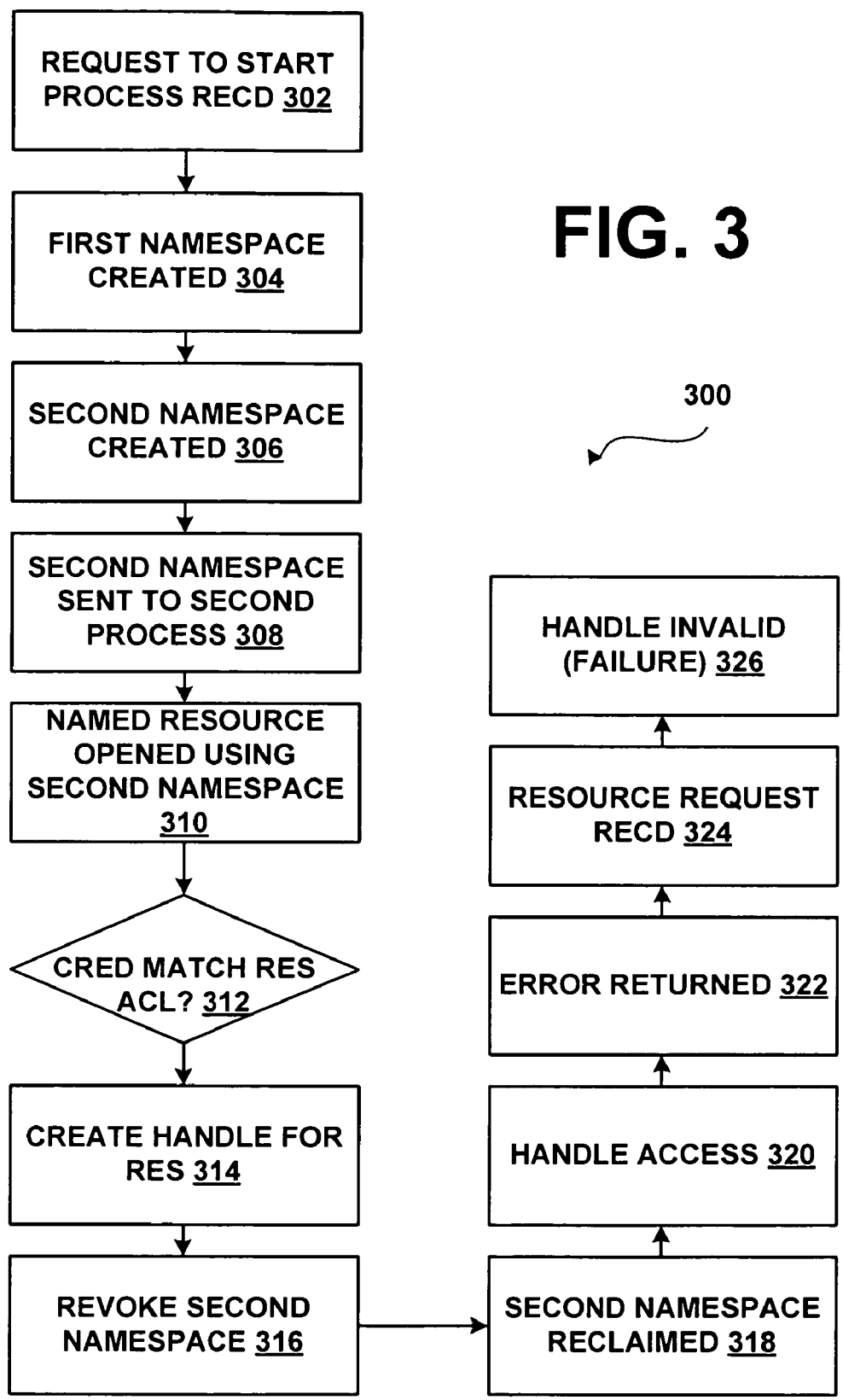
FIG. 3 is a flow diagram of a method for isolated access to named resources in accordance with some embodiments of the invention.

FIG. 3 illustrates a method 300 for isolating access to named resources. At 302 the operating system or operating system kernel receives a request to start a process from a user, associated with a set of credentials. At 304, a first isolated environment (e.g., naming environment or namespace) is created and the credentials of the user are associated with the first isolated environment (e.g., with the first namespace). Suppose that the process (e.g., a first process or sending process) wants to send a reference to a resource to a second process (the receiving process). The receiving process may or may not be initiated by the user who started the sending process. The receiving process may or may not be a trusted process. At 306 the operating system may receive a request from the first process to create a second naming environment (e.g., a second namespace). The second namespace may represent a subset of the first namespace. The second namespace may represent a view of the first namespace in which portions of the first namespace are not visible to the second process. The second namespace may represent a version of the first namespace in which the level of access available in the first namespace is restricted in the second namespace. The credentials of the sending isolated environment are associated with the receiving isolated environment. At 308 a reference is passed to the second process. The reference may represent an open handle to a resource, a name and an open handle to a naming environment with the expectation that the name will be resolved within the indicated naming environment or the reference may represent an opened naming environment. At 310, the named resource may be opened using the second namespace as the naming environment in which the name is resolved. At 312 the credentials associated with the second namespace or isolated environment is compared to the ACL of the requested resource, and if the credentials are sufficient, the operating system creates a handle for the resource, associates the handle to the second namespace and returns the handle (314) to the receiving process (also called a service). If the credentials associated with the second namespace or isolated environment are compared to the ACL of the requested resource, and are insufficient to obtain access to the resource, no handle to the resource is returned. At this point, process 2 can use the passed resource. If or when the sending processes wants to revoke the second namespace, the sending process may do so at 316. At 318, the second namespace will be reclaimed by the operating system and any handles obtained via the second namespace are revoked. Similarly, as the second process may itself create a new namespace, any namespaces derived therefrom, and any associated handles may be reclaimed, to any level of nesting. At 320, if the receiving process tries to access a revoked handle, the operating system returns an error at 322. If the receiving process tries to open another resource in the second namespace, at 324, the operating system does not return a handle because the handle has been revoked and the access fails. It will be appreciated that one of more of the above listed actions may be optional or skipped and that the actions may proceed in a sequence other than that depicted in FIG. 3.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for isolating access to a named resource comprising:
   a processor, wherein the processor is configured to execute an operating system, the operating system implementing an Access Control List ("ACL") and upon receiving a request to start a first process by a first user:
   initiate the first process in an isolated execution environment;
   create a first namespace;
   associate the first namespace with the first process;
   associate a credential of the first user with the first namespace;
   upon receiving a request by the first process to pass a named resource to a second process running by a second user in a second isolated execution environment:
   create a second namespace using the first namespace;
   associate the credential of the first user with the second namespace;
   provide a reference to the resource to the second process, wherein the reference comprises a first handle to the resource, a name and an open handle to the second namespace;
   upon receiving a request by the second process to open the resource, resolve the resource name using the second namespace; and
   when the credentials associated with the second namespace in comparison with the ACL of the requested resource are sufficient:
   create a second handle for the resource;
   associate the second handle with the second namespace; and
   return the second handle to the second process,
   wherein the operating system includes a kernel that creates the first and second namespace upon request.

2. The system of claim 1, wherein the second namespace is a subset of the first namespace.

3. The system of claim 1, wherein the second namespace is a view of the first namespace.

4. The system of claim 3, wherein the first and second namespaces respectively represent a first set of resources and a second set of resources and a portion of the resources in the first namespace are not visible in the second namespace.

5. The system of claim 3, wherein the second set of resources has restricted access rights with respect to the first set of resources.

6. The system of claim 1, wherein upon receiving a request from the first process to revoke the resource:
the second namespace is reclaimed; and
if a handle has been obtained by the second process via the second namespace, the handle is revoked.

7. The system of claim 6, wherein if a namespace has been derived from the second namespace, the derived namespace and any associated handle with the derived namespace is revoked.

8. A method of isolating by an operating system access to named resources comprising:
upon receiving a request to start a first process by a first user:
initiating the first process in an isolated execution environment;
creating a first namespace;
associating the first namespace with the first process;
associating a credential of the first user with the first namespace;
upon receiving a request by the first process to pass a named resource to a second process running by a second user in a second isolated execution environment:
creating a second namespace using the first namespace;
associating the credential of the first user with the second namespace;
providing a reference to the resource to the second process, wherein the reference comprises a first handle to the resource, a name and an open handle to the second namespace;
upon receiving a request by the second process to open the resource, resolving the resource name using the second namespace; and
when the credentials associated with the second namespace in comparison with an access control list of the requested resource are sufficient:
creating a second handle for the resource;
associating the second handle with the second namespace; and
returning the second handle to the second process,
wherein an operating system kernel creates the first and second namespace upon request.

9. The method of claim 8, wherein the second namespace is a subset of the first namespace.

10. The method of claim 8, wherein the second namespace is a view of the first namespace.

11. The method of claim 10, wherein the first and second namespaces respectively represent a first set of resources and a second set of resources and a portion of the resources in the first namespace are not visible in the second namespace.

12. The method of claim 10, wherein the second set of resources has restricted access rights with respect to the first set of resources.

13. The method of claim 8, wherein upon receiving a request from the first process to revoke the resource:
the second namespace is reclaimed; and
if a handle has been obtained by the second process via the second namespace, the handle is revoked.

14. A computer readable storage medium for isolating by an operating system access to named resources, the computer readable storage medium having stored thereon instructions that, when executed by a computer, cause the computer to perform a process comprising:
upon receiving a request to start a first process by a first user:
initiating the first process in an isolated execution environment;
creating a first namespace;
associating the first namespace with the first process;
associating a credential of the first user with the first namespace;
upon receiving a request by the first process to pass a named resource to a second process running by a second user in a second isolated execution environment:
creating a second namespace using the first namespace;
associating the credential of the first user with the second namespace;
providing a reference to the resource to the second process, wherein the reference comprises a first handle to the resource, a name and an open handle to the second namespace;
upon receiving a request by the second process to open the resource, resolving the resource name using the second namespace; and
when the credentials associated with the second namespace in comparison with an access control list of the requested resource are sufficient:
creating a second handle for the resource;
associating the second handle with the second namespace; and
returning the second handle to the second process,
wherein an operating system kernel creates the first and second namespace upon request.

15. The computer readable storage medium of claim 14, wherein the second namespace is a subset of the first namespace.

16. The computer readable storage medium of claim 14, wherein the second namespace is a view of the first namespace.

17. The computer readable storage medium of claim 16, wherein the first and second namespaces respectively represent a first set of resources and a second set of resources and a portion of the resources in the first namespace are not visible in the second namespace.

18. The computer readable storage medium of claim 16, wherein the second set of resources has restricted access rights with respect to the first set of resources.

19. The computer readable storage medium of claim 14, wherein upon receiving a request from the first process to revoke the resource:
the second namespace is reclaimed; and
if a handle has been obtained by the second process via the second namespace, the handle is revoked.

* * * * *